United States Patent [19]

Miyake et al.

[11] Patent Number: 5,034,253
[45] Date of Patent: Jul. 23, 1991

[54] PIPE FOR CIRCULATING WARM WATER

[75] Inventors: Shingi Miyake, Osaka; Kenji Hasegawa, Takatuski, both of Japan

[73] Assignee: Nippon Gohsei Kagaku Kogyo Kabushiki Kaisha, Osaka, Japan

[21] Appl. No.: 404,387

[22] Filed: Sep. 8, 1989

[30] Foreign Application Priority Data

Sep. 9, 1988 [JP] Japan ................... 63-226978

[51] Int. Cl.$^5$ ............................. F16L 9/12
[52] U.S. Cl. ........................ 428/36.6; 428/36.91
[58] Field of Search ............. 428/36.6, 36.7, 36.9, 428/36.91

[56] References Cited

U.S. PATENT DOCUMENTS

| | | | |
|---|---|---|---|
| 4,145,333 | 3/1979 | Minagawa et al. | 524/101 |
| 4,226,991 | 10/1980 | Nakahara et al. | 524/101 |
| 4,255,301 | 3/1981 | Minagawa et al. | 524/281 |
| 4,883,696 | 11/1989 | Iwanami et al. | 428/36.6 |
| 4,929,482 | 5/1990 | Moritani et al. | 428/36.6 |

FOREIGN PATENT DOCUMENTS 61-83035  4/1986  Japan .

Primary Examiner—James J. Seidleck
Attorney, Agent, or Firm—Armstrong, Nikaido, Marmelstein, Kubovcik & Murray

[57] ABSTRACT

A pipe for circulating warm water made of a laminate comprising a layer of a composition comprising:
(A) a hydrolyzed ethylene-vinyl acetate copolymer,
(B) a substituted phenol derivative and
(C) at least one of an organic phosphorous acid compound and a thioether compound. The pipe of the present invention has the excellent durability and its oxygen impermeability can be kept for a long period of time excellent.

4 Claims, No Drawings

PIPE FOR CIRCULATING WARM WATER

BACKGROUND OF THE INVENTION

The present invention relates to a pipe for circulating warm water, and more particularly to a warm water circulating pipe having excellent durability and oxygen impermeability.

As warm water pipes suitable for use in central heating, particularly floor heating installations by means of circulation of warm water, pipes made of iron or copper are widely used.

Recently, however, pipes made of plastics such as polyethylene, polypropylene and polybutene have been used more often in the place of pipes made of iron because of price and execution.

In a case of using such a plastic pipe, a metal device, such as a heat exchanger or a pump which is introduced the pipe, is corroded. It can be mainly considered that the corrosion is caused by oxygen which is introduced in warm water flowing through the pipe, because of the poor oxygen impermeability of the pipe.

Japanese Unexamined Patent Publication No. 61-83035 proposes, for improving the above-mentioned defect, a pipe made of a laminate comprising a layer of a composition comprising a hydrolyzed ethylene-vinyl acetate copolymer, or a pipe made of a laminate comprising a layer of a composition comprising a hydrolyzed ethylene-vinyl acetate copolymer and a substituted phenol compound. However, the above-mentioned defect is not sufficiently improved according to the proposal.

An object of the present invention is to provide a pipe for circulating warm water, which is improved with respect to the above defect.

This and other objects of the present invention will become apparent from the following description.

SUMMARY OF THE INVENTION

In accordance with the present invention, there is provided a pipe for circulating warm water made of a laminate comprising a layer of a composition comprising:
(A) a hydrolyzed ethylene-vinyl acetate copolymer,
(B) a substituted phenol derivative and
(C) at least one of an organic phosphorous acid compound and a thioether compound; particularly a pipe for circulating warm water made of a laminate comprising the layer of said composition, and a polyolefin layer joined together through an adhesive layer. The pipe of the invention is excellent in durability and its oxygen impermeability can be maintained at a high level for a long period of time. Therefore, even if the pipe comes into contact with warm water for a long period of time, water flowing through it does not corrode metal parts.

DETAILED DESCRIPTION

The pipe of the present invention is made of a laminate comprising a layer of the composition comprising (A) a hydrolyzed ethylene-vinyl acetate copolymer, (B) a substituted phenol derivative and (C) an organic phosphorous compound and/or a thioether compound, and other layers.

As the hydrolyzed ethylene-vinyl acetate copolymer (A), there are usually used hydrolyzed ethylene-vinyl acetate copolymers having an ethylene content of 20 to 80% by mole, preferably from 25 to 60% by mole and having a degree of hydrolysis in the vinyl acetate units of at least 90% by mole, preferably at least 95% by mole. When the ethylene content is less than 20% by mole, the oxygen impermeability is lowered. On the other hand, when the ethylene content is more than 80% by mole, the physical properties such as oxygen impermeability and printability become worse. Also, when the degree of hydrolysis is less than 90% by mole, the oxygen impermeability and the moisture resistance are lowered.

Among the hydrolyzed ethylene-vinyl acetate copolymers as mentioned above, a hydrolyzed ethylene-vinyl acetate copolymer having an intrinsic viscosity $[\eta]$ (measured at 30° C. in a 15% by weight aqueous solution of phenol) of 0.5 to 1.5 dl/g, preferably from 0.6 to 1.3 dl/g is preferably used from the viewpoint of mechanical strength of the pipe.

The hydrolyzed ethylene-vinyl acetate copolymer used in the invention may include a small amount of comonomers, e.g. α-olenfins such as propylene, isobutene, α-octene, α-dodecene and α-octadecene; unsaturated carboxylic acids and their salts, partial or complete alkyl esters, nitriles, amides and anhydrides; unsaturated sulfonic acids and their salts, and the like, so long as the excellent properties of the hydrolyzed ethylene-vinyl acetate copolymer are not impaired.

As the substituted phenol derivative (B) in the present invention, there are exemplified substituted hydroquinone compounds, substituted cresol compounds, substituted bisphenol compounds such as thiobisphenol compounds and methylene bisphenol compounds, substituted phenyl propionic acid ester, and the like. Phenol derivatives having t-butyl group are preferable.

Specific examples of the substituted phenol derivatives (B) are, for instance 2,5-di-t-butyl hydroquinone 2,6-di-t-butyl-p-cresol, 4,4'-thiobis(6-t-butylphenol), 2,2'-methylene-bis(4-methyl-6-t-butylphenol), tetrakis[methylene-3-(3',5'-di-t-butyl-4'-hydroxyphenyl)propionate]methane, octadecyl-3-(3',5'-di-t-butyl-4'-hydroxyphenyl)propionate, N,N'-hexamethylenebis(3,5-di-t-butyl-4'-hydroxy-hydrocinnamamide, 1,3,5-trimethyl-2,4,6-tris(3,5-di-t-butyl-4-hydroxybenzyl)benzene, pentaerithritol-tetrakis[3-(3,5-di-t-butyl-4-hydroxyphenyl)propionate, and the like.

Examples of the organic phosphorous acid compounds (C) are, for instance, a triaryl phosphite such as triphenyl phosphite, tris(p-nonylphenyl)phosphite or tris(2,4-di-t-butylphenyl)phosphite; an alkylaryl phosphite such as a monoalkyldiphenyl phosphite, e.g. diphenyl-i-octyl phosphite or diphenyl-i-decyl phosphite or a dialkylmonophenylphosphite, e.g. phenyl-di-i-octyl phosphite or phenyldiisodecyl phosphite; a trialkyl phosphite such as tri-i-octyl phosphite or tristearyl phosphite; other phosphite compounds such as tetraki(2,4-di-t-butylphenyl)-4,4'-biphenylenephosphonate, and the like.

Example of the thioether (sulfide) compounds (C) are, for instance, pentaerythritol-tetrakis(β-laurylthiopropionate), tetrakis[methylene-3-(dodecylthio)propionate]methane, bis[2-methyl-4-{3-n-alkylthiopropionyloxy{-5-t-butylphenyl]sulfide, and the like.

The amount of the component (B) is from 0.001 to 5 parts by weight, preferably from 0.05 to 1 part by weight, based on 100 parts by weight of the component (A). The amount of the component (C) is from 0.001 to 5 parts by weight, preferably from 0.05 to 1 part by weight, based on 100 parts by weight of the component (A). Also, the weight ratio of (B) to (C) is from 0.1 to 10, preferably from 0.5 to 8.

A laminate structure containing different kinds of resins formed into layers other than the layer, of the above-mentioned composition, are not particularly limited in the manufacture of the pipe of the invention, so long as the laminate has a layer of the above-mentioned hydrolyzed ethylene-vinyl acetate copolymer composition. Practically, a laminate having a structure wherein a layer of the above-mentioned composition and a layer of a polyolefin are provided joined together through an adhesive layer with, the polyolenfin layer being an inner layer of the pipe is useful [the above-mentioned hydrolyzed ethylene-vinyl acetate copolymer composition layer/the adhesive layer/the polyolefin layer as the inner layer of the pipe].

Any polyolenfin can be used without particular limitations, and non-crosslinked polyolenfin and crosslinked polyolefin can be used.

Examples of a non-crosslinked polyolenfin are for instance, polypropylene, high density polyethylene, linear low density polyethylene, polybutene-1, low density polyethylene and, modified polymers thereof. There polyolefins suitable have melt index of 0.01 to 10 g/10 minutes (measured at 190° C. under a load of 2,160 g).

The crosslinked polyolenfin can be made by crosslinking polyolefin in any manner. For instance, the polyolefin are crosslinked by means of a radical light, electron beam, α-ray, or water. Specifically, the polyolefins may be crosslinked with an organic peroxide, such as benzoyl peroxide, t-butyl peroxybenzoate or dicumyl peroxide, sulfur oxygen, and the like. Also, where the crosslinking is by means of light, a compound having a photosensitive group, such as, cinnamylidene group, is added, the olefin is copolymerized with the photosensitive group-containing compound or the polyolefin is modified with the photosensitive group-containing compound, and the resultant product is crosslinked with light. In the case of crosslinking with water, the olefin is copolymerized with a silyl group-containing compound and the obtained copolymer is crosslinked with a silanol condensation catalyst and water. In such a case, a comonomer such as vinyl acetate, acrylic acids or their esters may be added to the olefin and the silyl group-containing compound to give a copolymer. These copolymers can be obtained by melting the polyethylene with the silyl group-containing compound.

It is preferable that the degree of crosslinking is from 50 to 80% in consideration of maintaining a balance between heat resistance and flexibility. In the present invention, a polybutene can be used instead of the polyolefine.

As the adhesive layer (C), a polyolefin grafted with an unsaturated carboxylic acid compound in an amount of about 0.01 to 2.5% by weight is used.

Examples of the polyolefines used for forming the adhesive layer are, for instance, polyethylene, polypropylene, an ethylene-vinyl acetate copolymer, and the like. Examples of the unsaturated carboxylic acid compounds are, for instance, unsaturated carboxylic acids such as acrylic acid, methacrylic acid, crotonic acid, maleic acid, fumaric acid and itaconic acid, and their alkyl esters, anhydrides, amides, imides or salts such as acrylic amide, maleic diamide, fumaric acid diamide, maleic acid imide, maleic anhydride, zinc acrylate, ammonium acrylate and sodium methacrylate, and the like. The polyolefin can be grafted with the unsaturated carboxylic acid compound in any known manner. For example, there are exemplified a method in which the polyolefin is admixed with the unsaturated carboxylic acid compound and a radical polymerization initiator and the mixture is melted and reacted; a method in which the polyolefin is suspended or dissolved in a suitable solvent, to which the unsaturated carboxylic acid, the radical initiator and, if necessary a small amount of a monomer copolymerizable with a radical are added and the reaction is conducted to graft; a method using ultraviolet or other irradiation; a method in which oxygen, ozone or a shearing force is utilized.

The laminate can be prepared in any manner such as dry-laminating method or melt-coating method. Coextrusion is practically advantageous. Also, it is advantageous that the pipe has an outside diameter of 20 to 10 mm and a thickness of 1 to 5 mm. In the laminate, the thickness of the layer of the hydrolyzed ethylene-vinyl acetate copolymer composition is selected from the range of 10 to 500 μm, the thickness of the adhesive layer is selected from the range of 10 to 500 μm and the thickness of the polyolefin layer is selected from the range of 1,000 to 3,000 μm.

Warm water used has a temperature of 40° to 95° C., usually from 50° to 90° C.

The pipe for circulating warm water of the invention has excellent durability and can be used for a long period of time during which metal devices associated therewith are not completely corroded due to oxygen in the water, since the laminate, of which the pipe of the invention is made, has a layer of the composition comprising the hydrolyzed ethylene-vinyl acetate copolymer, the substituted phenol derivative and the organic phosphorous acid compound and/or thioether compound.

The present invention is more specifically described and explained by means of the following Examples and Comparative Examples in which all per cents and parts are by weight unless otherwise noted. It is to be understood that the present invention is not limited to the Examples, and various changes and modifications may be made in the invention without departing from the spirit and scope thereof.

EXAMPLE 1

One hundred parts of a high density polyethylene having a density of 0.952 g/ml and a melt index of 0.5 g/10 minutes commercially available under the trade mark "MITSUBISHI POLYETHY HD BX-50" from Mitsubishi Yuka Kabushiki Kaisha was admixed with 2 parts of vinyltrimethoxysilane dissolved in acetone and 0.2 part of dicumyl peroxide, the mixture was melt-kneaded at 230° C. in an extruder (a diameter: 65 mm, L/D: 24) and extruded in the state of a strand. The strand was cooled down and cut to give a pellet of an adduct of the polyethylene with the vinyl silane (vinyl silane content: 1.5%).

A pipe having three layers was prepared in following conditions:

An extruder was charged with 100 parts of the pellets of the adduct of the polyolefine obtained as above and 5 parts of a mixture of dibutyl tin laurate and MITSUBISHI POLYETY HD BX-50 (the content of dibutyl tin laurate in the mixture: 2%), another extruder was charged with a composition of (A) a hydrolyzed ethylene-vinyl acetate copolymer having an ethylene content of 44% by mole, a degree of hydrolysis in vinyl acetate units of 99.3% by mole and an intrinsic viscosity of 0.65 dl/g, (B) N,N'-hexamethylenebis(3,5-di-t-butyl-4-hydroxyhydrocinnamamide and (C) tris(2,4-di-t-butylphenyl)phosphite [(A):(B):(C)=100 parts: 0.25 part: 0.5 part] and another extruder was charged with a polyethylene modified with maleic anhydride (proportion of maleic anhydride: 0.02%) having a melt index of 1.3 g/10 minutes (measured at 190° C. under a load of 2,160 g) commercially available under the trade mark "ADMER NF-500" from Mitsui Sekiyu Kagaku Kogyo Kabushiki Kaisha as an adhesive, and coextrusion was conducted, by using a 3-layer round die at a temperature of 230° C. to give a pipe having an outside diameter of 20 mm and having a structure wherein the hydrolyzed ethylene-vinyl acetate copolymer composition layer and the adduct of the polyethylene layer were joined together through the adhesive layer (the layer of the polyethylene modified with maleic anhydride) as the outer layer and the inner layer of the pipe, respectively; giving a pipe in which the hydrolyzed copolymer composition layer was the outer layer/the adhesive layer/and the adduct of the polyethylene with the vinyl silane layer was the inner layer.

Then, steam having a temperature of 120° C. was blown into the pipe to crosslink the polyethylene adduct with the vinyl silane. The degree of crosslinking in the polyethylene adduct was 76%. Also, as to the pipe, the thickness of the outer layer was 100 μm, the thickness of the inner layer was 2,000 μm and the thickness of the adhesive layer was 150 μm.

Warm water having a temperature of 90° C. was passed through the inside of the pipe for 480 hours. As to the pipe, oxygen permeability was measured at 20° C. under 100% RH (relative humidity) by using OX-TRAN 10/50 made by MOCON Co., Ltd.

The result was an oxygen permeability of 2.2 cc/m² 24 hours.

Then, floor heating was conducted for one year (8 hours per day), with the pipe laid under floors of four rooms (100 m of pipe per one room), by passing warm water having a temperature of 90° C. through the pipe. A test piece made of iron (10 cm × 10 cm, thickness: 0.1 mm) was put in a warm water circulating tank and was allowed to stand for one year in the tank. The test piece was observed with the naked eye. The test piece was scarcely rusted.

COMPARATIVE EXAMPLES 1–3

The procedure of Example 1 was repeated except that as the layer of the hydrolyzed ethylene-vinyl acetate copolymer composition, only the hydrolyzed ethylene-vinyl acetate copolymer (A) was used (Com. Ex. 1), the hydrolyzed copolymer (A) and tris(2,4-di-t-buthlphenyl)phosphite (C) were used (Com. Ex. 2), or the hydrolyzed ethylene-vinyl acetate copolymer (A) and the N,N'-hexamethylene-bis(3,5-di-t-butyl-4-hydroxyhydrocinnamamide (B) were used (Com. Ex. 3) to give a pipe having three layers.

The oxygen permeability was measured in the same manner as in Example 1 and the results were 6.2 cc/m².24 hours (Com. Ex. 1), 4.5 cc/m².24 hours (Com. Ex. 20) and 4.1 cc/m².24 hours (Com. Ex. 3), respectively.

Also, after the iron test piece was allowed to stand in the tank for one year, the piece was observed in the same manner as in Example 1.

The test piece was so rusted that its surface was uneven (Com. Ex. 1), or it was rusted all over the surface (Com. Ex. 2 and 3).

EXAMPLE 2

The procedure of Example 1 was repeated except that a hydrolyzed ethylene-vinyl acetate copolymer having an ethylene content of 38% by mole, a degree of hydrolysis of 99.6% by mole and an intrinsic viscosity of 1.05 dl/g was used as the component (A) in the hydrolyzed copolymer composition to give a pipe having three layers.

The oxygen permeability was measured in the same manner as Example 1 and the result was 2.9 cc/m².24 hours.

EXAMPLES 3 TO 5

The procedure of Example 1 was repeated except that the following components (B) and (C) in the hydrolyzed ethylene-vinyl acetate copolymer composition were used in the following weight ratio to give a pipe having three layers.

EXAMPLE 3

Component (B): N,N'-hexamethylenebis(3,5-di-t-butyl-4-hydroxy-hydrocinnamamide) 0.4 part.
Component (C): Pentaerithritol-tetrakis(β-larylthiopropionate) 0.2 part.

EXAMPLE 4

Component (B): N,N'-hexamethylenebis(3,5-di-t-butyl-4-hydroxy-hydrocinnamamide) 0.3 part.
Component (C): Di(2,4-di-t-buthlphenyl)-pentaerithritoldiphosphite 0.3 part.

EXAMPLE 5

Component (B): Pentaerithritol-tetrakis[3-(3,5-di-t-butyl-4-hydroxyphenyl)propionate] 0.2 part.
Component (C): Tris(2,4-di-t-butylphenyl)phosphite 0.4 part.

As to each of the obtained pipes in Examples 3–5, the oxygen permeability was measured in the same manner as in Example 1. The results were 2.3 cc/m².24 hours (Ex. 3), 2.5 cc/m².24 hours (Ex. 4) and 2.7 cc/m².24 hours (Ex. 5), respectively.

EXAMPLE 6

The procedure of Example 1 was repeated except that a high density polyethylene having a density of 0.955 g/ml and a melt index of 0.2 g/10 minutes was used instead of the adduct of the polyethylene with the vinyl silane to give a pipe having three layers.

The oxygen permeability was measured in the same manner as in Example 1 and the result was 2.00 cc/m².24 hours.

EXAMPLE 7

The procedure of Example 1 was repeated except that a polyolefin modified with a peroxide (prepared by extruding a mixture of 100 parts of a low density polyethylene having a melt index of 0.8 g/10 minutes and a density of 0.920 g/ml and 2 parts of dicumyl peroxide at 150° C.) was used instead of the adduct of the polyethylene with the vinyl silane to give a pipe having three layers.

The oxygen permeability was measured in the same manner as in Example 1 and the resurt was 2.3 cc/m².24 hours.

In addition to the ingredients used in the Examples, other ingredients can be used at set forth in the specification to obtain substantially the same results.

What we claim is:

1. A pipe for circulating warm water made of a laminate comprising a layer of a composition comprising:
   (A) a hydrolyzed ethylene-vinyl acetate copolymer,
   (B) a substituted phenol derivative and
   (C) at least one of a phosphite compound and a thioether compound.

2. The pipe of claim 1, wherein said laminate has a layer of a polyolefin bonded to said hydrolyzed ethylene-vinyl acetate copolymer through an adhesive layer.

3. The pipe of claim 2, wherein said polyolefin has been crosslinked.

4. The pipe of claim 2, wherein said polyolefin has been crosslinked with water.

* * * * *